United States Patent [19]
Mee

[11] 3,907,860
[45] Sept. 23, 1975

[54] ACYCLIC NITRILES

[75] Inventor: Alec Mee, Norton, England

[73] Assignee: Imperial Chemical Industries Limited, London, England

[22] Filed: Mar. 4, 1974

[21] Appl. No.: 447,830

[30] Foreign Application Priority Data
Mar. 23, 1973 United Kingdom............... 14092/73

[52] U.S. Cl..... 260/465.3; 260/465.6; 260/465.8 R; 260/586 P; 260/617 H
[51] Int. Cl.²............ C07C 120/00; C07C 120/14; C07C 121/26
[58] Field of Search........ 260/465.3, 465.8 R, 465.6

[56] References Cited
UNITED STATES PATENTS

| | | | |
|---|---|---|---|
| 3,365,482 | 1/1968 | Khoobiar | 260/465.3 |
| 3,433,823 | 3/1969 | McMahon | 260/465.3 |
| 3,579,559 | 5/1971 | Unger | 260/465.8 X |
| 3,624,125 | 11/1971 | Barnett et al. | 260/465.3 |

FOREIGN PATENTS OR APPLICATIONS

| | | | |
|---|---|---|---|
| 42-11810 | 5/1967 | Japan | 260/465.3 |

*Primary Examiner*—Joseph P. Brust
*Attorney, Agent, or Firm*—Cushman, Darby & Cushman

[57] ABSTRACT

Acyclic nitriles are made by heating a cycloalkane, cycloalkanol or cycloalkanone in the liquid phase with ammonia and oxygen, preferably in the presence of a catalyst. Cycloalkanols and cycloalkanones also formed in the reaction with cycloalkane starting materials may be recycled to give more nitrile. Cyclohexane may thus be converted to adiponitrile.

6 Claims, No Drawings

ACYCLIC NITRILES

This invention relates to the manufacture of acyclic nitriles and more especially to the manufacture of acyclic nitriles by the reaction of cycloalkanes, cycloalkanols or cycloalkanones, in the liquid phase with ammonia and oxygen.

The invention provides a process for the manufacture of acyclic nitriles which comprises heating a cycloalkane or a cycloalkanol or a cycloalkanone or mixtures thereof in the liquid phase while contacting them with ammonia and oxygen, preferably in the presence of a catalyst, and isolating the nitriles from the resulting mixture.

Cycloalkanes which may be used in the process of our invention include in particular those having from 5 to 12 carbon atoms in the ring. They also include cycloalkanes with alkyl substituents. As examples of suitable cycloalkanes there may be mentioned cyclopentane, methylcyclopentane, cyclohexane, methylcyclohexane, cyclo-octane and cyclododecane. Cyclohexane is particularly important.

There may also be used the corresponding cycloalkanols and cycloalkanones, which may be obtained, for example, often in admixture with each other, by oxidation of the cycloalkane, for example in the liquid phase with a molecular oxygen-containing gas. Such cycloalkanols and cycloalkanones include, for example, cyclopentanol, cyclopentanone, cyclohexanol, cyclohexanone, cyclo-octanol, cyclo-octanone, cyclododecanol and cyclododecanone.

The cycloalkanols and cycloalkanones may be used, separately or in admixture, in the absence of a cycloalkane, as starting material in the process of our invention. Since, however, as described hereafter, the corresponding cycloalkanol and usually the corresponding cycloalkanone are formed as intermediates when the process of our invention is applied to cycloalkanes, the cycloalkanols and cycloalkanones so formed may be separated from the reaction mixture and recycled for admixture with the cycloalkane starting material. The cycloalkanols and cycloalkanones corresponding with the cycloalkane are those having the same carbon skeleton.

Heating is effected at temperatures in the range 90° to 250°C at pressures sufficient to keep the cycloalkane in the liquid phase, for example at pressures up to 100 atmospheres (101 bar) or above. A preferred temperature range is 140° to 200°C. If the material to be oxidised is contained in a non-oxidisable liquid diluent rather higher temperatures are preferred than when no such diluent is present. During the heating stage ammonia and oxygen are passed through the cycloalkane, cycloalkanol or cycloalkanone. The oxygen may be used as such, but is preferably used diluted with an inert gas, especially with nitrogen. Air is a particularly convenient oxygen-containing mixture to use, but mixtures of oxygen and nitrogen with a higher or lower oxygen content than that of the air may also be used. The ammonia is preferably used in excess in relation to the oxygen, for example the rate of passage of ammonia may be from 10 to 500 times that of oxygen on a molar basis.

The reaction is preferably carried out in the presence of a catalyst, since better yields are thereby obtained. The preferred catalysts are compounds of metals belonging to the class of transition metals. Transition metals may be defined as those which have partly filled shells of d-electrons in some, at least, of their compounds. They are listed in Appendix I, page 379 of "The Theory of Transition Metal Ions" by J. S. Griffith, University Press, Cambridge, 1961. They include the elements of atomic number 21 to 30, 39 to 48, and 58 to 80. Preferred catalysts are compounds of vanadium or manganese, but especially of copper or cobalt, or mixtures thereof. Suitable compounds include the oxides and hydroxides and salts, whether salts with inorganic acids such as the halides, e.g. chloride or bromide, or sulphates or carbonates, or salts with organic acids, for example the acetates, trifluoroacetates or naphthenates. Particularly suitable are the salts of organic carboxylic acids which are soluble in the cycloalkyl compound used as starting material, especially salts of acyclic or saturated carbocyclic carboxylic acids having from 6 to 20 carbon atoms, for example naphthenates, hexanoates, octoates or stearates. Such compounds as the carbonyls or phthalocyanines may also be used. The compounds may also be used in the form of their amine complexes obtained by reaction with ammonia, and may be converted into such compounds in situ by the action of the ammonia used in the reaction.

The reaction may be effected in the presence of a liquid diluent. Suitable diluents include benzene, toluene, xylenes, methanol, acetonitrile, succinonitrile, benzonitrile, phthalonitrile, adiponitrile, diphenyl and diphenyl oxide. By-products of the reaction may also be recycled for use as diluent.

It may be desirable to incorporate an initiator in the reaction mixture, for example a peroxide or a ketone such as cyclohexanone.

The products of the reaction are acyclic mono- and di-nitriles. In the case of cyclohexane as starting material the principal nitrile products are adiponitrile and ω-hydroxycapronitrile. Other nitrile products formed include $C_6$ and $C_5$ mononitriles and $C_5$ and $C_4$ dinitriles. There are also formed cyclic alcohols and usually cyclic ketones, for example cyclohexane gives cyclohexanol and cyclohexanone, but these are converted by further reaction with ammonia and oxygen according to the process of our invention to nitrile products, so that they may be recycled in the process to produce more nitrile. Other non-nitrile products include $C_6$ and $C_5$ monoamides and diamides.

Water is also produced in the reaction and is preferably removed continuously as the reaction proceeds. The nitrile products of the reaction may be separated by conventional means, for example by fractional distillation or by extraction with a solvent, for example methanol or acetonitrile, followed by distillation.

The process of our invention is particularly important for the conversion of cyclohexane to adiponitrile. Adiponitrile is particularly important as a precursor of hexamethylene diamine which is made from it by catalytic hydrogenation. Hexamethylene diamine is an important intermediate in the manufacture of polymers, especially of polyamides made by polycondensation with dicarboxylic acids, for example with adipic acid to give polyhexamethylene adipamide (nylon 6,6). Such polyamides are used in mouldings and for melt spinning into synthetic fibres.

Adiponitrile has previously been prepared from cyclohexane by a three stage process involving air oxidation of cyclohexane to 'KA', a mixture consisting principally of cyclohexanol and cyclohexanone, nitric acid oxidation of KA to adipic acid and dehydrative amination of adipic acid to adiponitrile. By the process of our invention cyclohexane may be converted to adiponitrile in a single stage. The ω-hydroxycapronitrile produced in our process also gives adiponitrile on further reaction with ammonia and oxygen and, as already mentioned, cyclohexanol and cyclohexanone produced in the reaction may be recycled to give nitrile products, so that it is possible to operate our process in a continuous manner to obtain adiponitrile as the principal product. When operated in this way it is possible to obtain an overall yield of adiponitrile from cyclohexane of at least 45 to 50 percent.

It has been proposed in British Patent Specifications Nos. 1,195,036 and 1,195,037 to contact a gaseous mixture of cyclohexane, ammonia and oxygen with a solid catalyst comprising a compound of antimony or molybdenum at an elevated temperature. The product is said to contain a mixture of adiponitrile, glutaronitrile and succinonitrile. The method has not proved suitable as a basis for a commercial method for making adiponitrile from cyclohexane. Although yields of adiponitrile of up to about 25 percent are said to be obtained, the other materials said to be formed with it are not convertible to adiponitrile.

The invention is illustrated but not limited by the following Examples.

EXAMPLE 1

1 litre of cyclohexane + 0.02 moles cobalt naphthenate were pressured to 450 psig (32 bars absolute) at 180° with nitrogen in an apparatus arranged for continuous removal of water as formed. Ammonia (200 liters/hour) and air (100 l/hr. were passed in. After an induction period of 30 minutes oxygen uptake commenced. After 45 minutes further oxidation, the air and ammonia were turned off. After removal of the excess cyclohexane, examination of the residual oxidate showed weight yields of adiponitrile of 14.0 percent and of ω-hydroxycapronitrile of about 1 to 5.5 percent conversion. A weight yield of 62 percent of cyclohexanol/cyclohexanone, over 95 percent of which was cyclohexanol, was also obtained. After 5 ml. of water were separated during the reaction. In the absence of the catalyst the yield of adiponitrile was less than 1 percent.

When Example 1 was repeated using copper naphthenate instead of cobalt naphthenate as catalyst, a weight yield of adiponitrile of 6 percent at a conversion of 5 percent was obtained, together with a 51 percent yield of cyclohexanol/cyclohexanone.

EXAMPLE 2

1 litre of 50% v/v cyclohexane in benzene and 0.02 mole of cobalt naphthenate was pressured to 475 psig (34 bars absolute) at 195°C with nitrogen in an apparatus as used in Example 1. Flows of ammonia and air as in Example 1 were passed for 1 hour. After removing excess benzene and cyclohexane examination of the oxidate showed weight yields of adiponitrile of 14 percent and of ω-hydroxycapronitrile of 13.6 percent at approximately 5 percent conversion of cyclohexane. A weight yield of 36.5 percent of cyclohexanol/cyclohexanone, over 95 percent of which was cyclohexanol, was also obtained. About 5 mls. of water were separated during the reaction. In the absence of catalyst the yield of adiponitrile was less than 1 percent.

When Example 2 was repeated with more accurate control of the ammonia flow, the weight yield of adiponitrile was 26 percent and of ω-hydroxycapronitrile 20 percent at a conversion of 4.5 percent. A weight yield of 34 percent of cyclohexanol/cyclohexanone was also obtained.

EXAMPLE 3

1 litre of a solution of 0.04 mole of cyclohexanone and 0.04 mole of cobalt naphthenate in benzene was treated, by the general method described in Example 1, with ammonia and air, each passed at a rate of 100 litres/hour, at a temperature of 190°C and a pressure of 350 psig (25 bars absolute). After 20 minutes, all of the cyclohexanone was converted and the weight yield of adiponitrile was 43 percent.

EXAMPLE 4

1 litre of a solution of 0.05 mole of cyclohexanol and 0.02 mole of cobalt naphthenate in benzene was treated as in Example 3 with ammonia and air at a temperature of 190°C and a pressure of 450 psig, (32 bars absolute). After 45 minutes the conversion was 17 percent and the weight yield of adiponitrile 36 percent.

EXAMPLE 5

The process of Example 4 was repeated except that ω-hydroxycapronitrile was used instead of cyclohexanol. After 1 hour the conversion was 30 percent and the weight of adiponitrile 60 percent.

I claim:

1. A process for the manufacture of adiponitrile and mixtures thereof with ω-hydroxycapronitrile which comprises heating a reactant selected from the group consisting of cyclohexane, cyclohexanol, cyclohexanone or mixtures thereof in the liquid phase at 90° to 250°C at a pressure sufficient to maintain said reactant in the liquid phase while passing ammonia and oxygen, the rate of passage of ammonia being 10 to 500 times that of oxygen on a molar basis, in the presence of a sufficient amount of catalyst to obtain adiponitrile, said catalyst being selected from the group consisting of a copper, cobalt, vanadium or manganese halide or salt of an organic carboxylic acid which is soluble in said reactant and present in an amount sufficient to obtain adiponitrile.

2. The process of claim 1 in which heating is effected at temperatures in the range 140° to 200°C.

3. The process of claim 1 carried out in presence of a liquid diluent.

4. The process of claim 1 in which the starting material includes cyclohexane, and in which corresponding cyclohexanol and cyclohexanone formed in the reaction from the cyclohexane are recycled for further reaction with ammonia and oxygen to produce more adiponitrile.

5. A continuous process according to claim 1 for the manufacture of adiponitrile in which cyclohexanol, cyclohexanone and ω-hydroxycapronitrile formed in the reaction are recycled, and the adiponitrile is separated.

6. The process of claim 1 in which the catalyst is selected from the group consisting of cobalt naphthenate and copper naphthenate.

* * * * *